US005656646A

United States Patent [19]

Perner et al.

[11] Patent Number: 5,656,646
[45] Date of Patent: Aug. 12, 1997

[54] MIXTURES OF POLYMERS OF MONOETHYLENICALLY UNSATURATED DICARBOXYLIC ACIDS AND POLYMERS OF ETHYLENICALLY UNSATURATED MONOCARBOXYLIC ACIDS AND/OR POLYAMINOCARBOXYLIC ACIDS AND THEIR USE

[75] Inventors: Johannes Perner, Neustadt; Paul Diessel, Mutterstadt; Helmut Guembel, Dannenfels; Walter Denzinger, Speyer; Heinrich Hartmann, Limburger; Matthias Kroner, Eisenberg, all of Germany

[73] Assignee: BASF Aktiengesellschaft, Ludwigshafen, Germany

[21] Appl. No.: 424,486

[22] PCT Filed: Nov. 11, 1993

[86] PCT No.: PCT/EP93/03159

§ 371 Date: May 22, 1995

§ 102(e) Date: May 22, 1995

[87] PCT Pub. No.: WO94/12571

PCT Pub. Date: Jun. 9, 1994

[30] Foreign Application Priority Data

Nov. 20, 1992 [DE] Germany ............ 42 39 076.1

[51] Int. Cl.⁶ .................. C11D 3/37; C08L 35/00
[52] U.S. Cl. .......... 510/361; 510/223; 510/230; 510/247; 510/434; 510/410; 510/471; 510/472; 510/474; 510/476; 510/477; 510/480; 524/56; 524/301; 524/32; 524/556; 524/602; 525/54.3; 525/183; 525/221
[58] Field of Search .............. 252/174.23, 174.24, 252/DIG. 2, 135; 524/321, 56, 556, 602, 301; 525/221, 54.3, 180; 510/476, 477, 470, 471, 472, 480, 361

[56] References Cited

U.S. PATENT DOCUMENTS

| 3,810,834 | 5/1974 | Jones et al. ............... 210/58 |
| 4,559,159 | 12/1985 | Denzinger et al. ........ 252/174.24 |
| 4,818,795 | 4/1989 | Denzinger et al. ........ 525/327.8 |
| 4,832,864 | 5/1989 | Olson .................. 252/174.12 |
| 5,073,269 | 12/1991 | Denzinger et al. .......... 210/698 |
| 5,118,439 | 6/1992 | Aoyagi et al. ............... 252/99 |
| 5,525,257 | 6/1996 | Kleinstück et al. ........... 252/181 |

FOREIGN PATENT DOCUMENTS

| 0 009 171 | 4/1980 | European Pat. Off. . |
| 0 025 551 | 3/1981 | European Pat. Off. . |
| 0 075 820 | 4/1983 | European Pat. Off. . |
| 0 264 627 | 4/1988 | European Pat. Off. . |
| 0 276 464 | 8/1988 | European Pat. Off. . |
| 0 396 303 | 11/1990 | European Pat. Off. . |
| 0 441 197 | 8/1991 | European Pat. Off. . |
| 2910133 | 9/1980 | Germany . |
| 1 024 725 | 4/1966 | United Kingdom . |
| 1 411 063 | 10/1975 | United Kingdom . |

*Primary Examiner*—Paul Lieberman
*Assistant Examiner*—Lorna M. Douyon
*Attorney, Agent, or Firm*—Oblon, Spivak, McClelland, Maier & Neustadt, P.C.

[57] ABSTRACT

Mixtures of (I)

polymers of monoethylenically unsaturated dicarboxylic acids having a molecular weight of from 200 to 5,000 and (II)

(1) copolymers having a molecular weight of from 10,000 to 150,000 and comprising (a) from 10 to 70% by weight of monoethylenically unsaturated $C_4$–$C_8$-dicarboxylic acids or the salts thereof and (b) from 30 to 90% by weight of monoethylenically unsaturated $C_3$–$C_{10}$-monocarboxylic acids and/or the salts thereof, (2) graft polymers having a molecular weight of from 5,000 to 150,000, which are obtainable by free radical graft polymerization of (A) monoethylenically unsaturated $C_3$–$C_{10}$-carboxylic acids or the anhydrides and/or the salts thereof in the presence of (B) mono-, oligo- or polysaccharides and the derivatives thereof in a weight ratio (A) : (B) of (95 to 20) : (5 to 80), and/or (3) polyaminocarboxylic acids and/or polymers containing aminocarboxylic acid groups contain the components (I) and (II) in a weight ratio of from 10 : 0.5 to 0.5 : 10 and are used as additives for phosphate-free or low-phosphate textile detergents or as dispersants or coating inhibitors in cleaners for hard surfaces.

13 Claims, No Drawings

MIXTURES OF POLYMERS OF MONOETHYLENICALLY UNSATURATED DICARBOXYLIC ACIDS AND POLYMERS OF ETHYLENICALLY UNSATURATED MONOCARBOXYLIC ACIDS AND/OR POLYAMINOCARBOXYLIC ACIDS AND THEIR USE

FIELD OF THE INVENTION

The present invention relates to mixtures of polymers of monoethylenically unsaturated dicarboxylic acids and polymers of monoethylenically unsaturated mono-carboxylic acids and/or polyaminocarboxylic acids and the use of the mixtures as additives for phosphate-free or low-phosphate textile detergents, as additives in cleaners for hard surfaces and as water softeners.

DISCUSSION OF RELATED ART

GB-A-1 024 725 discloses a process for the preparation of polymaleic anhydride, in which maleic anhydride is polymerized in inert solvents, for example dialkyl ethers, tetrahydrofuran, dioxane, benzene or chlorohydrocarbons, such as chloroform, in the presence of organic percarbonates or diacyl peroxides. Particularly preferred solvents are benzene and chloroform. For example, diisopropyl percarbonate, dibenzoyl peroxide or dicyclohexyl percarbonate are used as polymerization initiators, in amounts of from 2 to 40% by weight, based on maleic anhydride. The polymers thus prepared contain considerable amounts of unpolymerized maleic anhydride.

In the process of GB-A-1 411 063, polymaleic anhydride is obtained by polymerizing maleic anhydride in xylene as a solvent, which contains up to 99% of orthoxylene, from 15 to 40% by weight, based on maleic anhydride, of di-tert-butyl peroxide being used as a polymerization initiator. The polymers prepared by this process also contain considerable amounts of unpolymerized maleic anhydride.

U.S. Pat. No. 3,810,834 discloses that hydrolyzed polymaleic anhydrides having a molecular weight of from 300 to 5,000 prior to hydrolysis or water-soluble salts of such hydrolyzed polymaleic anhydrides are used in the water treatment, scale formation being reduced and in many cases being virtually completely prevented. The polymers which are suitable for this purpose are prepared by polymerizing maleic anhydride in toluene using benzoyl peroxide and subsequently hydrolyzing the resulting polymaleic anhydride. Since the polymerization of the maleic anhydride is not complete and separation of unpolymerized maleic anhydride from the polymer is difficult, the polymaleic acids contain considerable amounts of maleic acid. This disadvantage is avoided in the process disclosed in U.S. Pat. No. 4,818,795, in which peroxyesters are used as polymerization initiators.

EP-A-0 264 627 discloses slightly crosslinked, water-soluble polymaleic acids which are obtainable by polymerizing maleic anhydride with from 0.1 to 10% by weight, based on maleic anhydride, of a crosslinking agent containing at least 2 ethylenically unsaturated double bonds, in an aromatic hydrocarbon at from 60° to 200° C. in the presence of from 1 to 20% by weight, based on maleic anhydride, of a peroxyester and hydrolyzing the polymer containing anhydride groups. The polymerization is preferably carried out in benzene, toluene, xylene, ethylbenzene, diethylbenzene, isopropylbenzene, diisopropylbenzene or a mixture of the stated aromatic hydrocarbons. The water-soluble polymaleic acids obtainable in this way are used as water treatment agents for reducing scaling and sediment due to water hardness in water-conveying systems.

EP-B-0 276 464 discloses a process for the preparation of water-soluble copolymers of maleic acid, in which maleic anhydride and from 1 to 20% by weight of a monoethylenically unsaturated monomer copolymerizable with maleic anhydride are copolymerized in an aromatic hydrocarbon at from 60° to 210° C. in the presence of from 1 to 20% by weight, based on the monomers, of peroxyesters. The copolymers thus obtainable are used as water treatment agents in water-conveying systems.

EP-B-0 009 171 discloses a process for the preparation of polymaleic acids from maleic anhydride in the presence of acetic anhydride and hydrogen peroxide as a catalyst. The polymaleic acids obtainable therefrom by hydrolysis are used as builders and incrustation inhibitors in detergents.

EP-A-0 396 303 discloses a process for the preparation of polymers of maleic acid, in which the polymerization of the maleic acid is carried out in the presence or absence of copolymerizable water-soluble ethylenically unsaturated monomers with the use of from 12 to 150 g of hydrogen peroxide and from 0.3 to 500 ppm of a polyvalent metal ion, the amounts in each case being based on the monomers used. The resulting polymers of maleic acid have improved biodegradability. They are used as builders in detergents or as scale inhibitors. A similar process for the preparation of maleic acid polymers by polymerizing maleic acid in an aqueous medium is disclosed in EP-A-0 337 694.

EP-B-0 075 820 discloses a process for the preparation of copolymers of monoethylenically unsaturated mono- and dicarboxylic acids, in which monomer mixtures of from 10 to 60% by weight of monoethylenically unsaturated dicarboxylic acids, such as maleic acid, and from 90 to 40% by weight of a monoethylenically unsaturated monocarboxylic acid of 3 to 10 carbon atoms, such as acrylic acid or methacrylic acid, are polymerized in an aqueous medium at a degree of neutralization of from 20 to 80% during the polymerization reaction in the aqueous medium at from 60° to 150° C. using from 0.5 to 5% by weight, based on the monomers, of a water-soluble initiator. Copolymers prepared by this process from maleic acid and acrylic acid have residual contents of unpolymerized maleic acid of less than 1.5% by weight. These copolymers are used as phosphate substitutes having an incrustation-inhibiting effect in detergents. This use is disclosed in EP-B 0 025 551.

DE-A-2 910 133 discloses builders for detergents and cleaning agents, which builders consist of a mixture of at least one copolymer of from 35 to 80 mol % of (meth)acrylic acid and from 20 to 65 mol % of a hydroxyalkyl acrylate where the hydroxyalkyl group is of 2 to 4 carbon atoms and polymaleic acid having a molecular weight of from 200 to 1,500.

EP-A-0 441 197 discloses graft polymers which are obtainable by free radical copolymerization of
(A) monomer mixtures of
  (a) 90-10% by weight of monoethylenically unsaturated $C_4$–$C_8$-dicarboxylic acids or anhydrides or alkali metal and/or ammonium salts thereof,
  (b) 10–90% by weight of monoethylenically unsaturated $C_3$–$C_{10}$-carboxylic acids or alkali metal and/or ammonium salts thereof,
  (c) 0–40% by weight of other monoethylenically unsaturated monomers which are copolymerizable with the monomers (a) and (b) and
  (d) 0–5% by weight of monomers having at least 2 ethylenically unsaturated nonconjugated double bonds in the molecule, in the presence of (B) monosaccharides, oligosaccharides, polysaccharides, oxidatively, hydrolytically or enzymatically degraded polysaccharides, oxidized hydrolytically degraded or oxidized enzymatically degraded polysaccharides, chemically modified mono-, oligo- or polysaccharides or mixtures of the stated compounds in the molar ratio (A) : (B) of (95-20) : (5–80). The graft polymers are used as additives for detergents and cleaning agents, in amounts of from 0.1 to 20% by weight, based on the particular formulation.

DESCRIPTION OF THE INVENTION

It is an object of the present invention to provide, for use in detergents and cleaning agents, additives which are more effective with regard to the incrustation-inhibiting action and the primary washing action than the products used to date for this purpose.

It is the further object of the present invention to provide additives which, in cleaners for hard surfaces, prevent undesirable formation of deposits, as well as additives for water softeners, which themselves serve as additives for the textile washing process.

We have found that these objects are achieved, according to the invention, by mixtures of (I) polymers of monoethylenically unsaturated dicarboxylic acids having a molecular weight of from 200 to 5,000 and comprising
  (a) from 80 to 100% by weight of monoethylenically unsaturated dicarboxylic acids or alkali metal, ammonium or alkaline earth metal salts thereof,
  (b) from 0 to 20% by weight of copolymerizable, monoethylenically unsaturated monomers and/or
  (c) from 0 to 2% by weight of copolymerizable monomers which contain at least two ethylenically unsaturated double bonds,
and
(II)
(1) copolymers having a molecular weight of from 10,000 to 150,000 and comprising
  (a) from 10 to 70% by weight of monoethylenically unsaturated $C_4$–$C_8$-dicarboxylic acids or alkali metal, ammonium or alkaline earth metal salts thereof and
  (b) from 30 to 90% by weight of monoethylenically unsaturated $C_3$–$C_{10}$-monocarboxylic acids or alkali metal, ammonium or alkaline earth metal salts thereof,
(2) graft polymers having a molecular weight of from 5,000 to 150,000, which are obtainable by free radical polymerization of
  (A) monoethylenically unsaturated $C_3$–$C_{10}$-carboxylic acids or anhydrides, alkali metal salts, ammonium salts or alkaline earth metal salts thereof, in the presence of
  (B) mono-, oligo- or polysaccharides which may be oxidatively, hydrolytically or enzymatically degraded, chemically modified mono-, oligo- or polysaccharides or mixtures of the stated compounds in a weight ratio (A) : (B) of (95 to 20) : (5 to 80)
and
(3) polyaminocarboxylic acids and/or polymers containing aminocarboxylic acid structures,
the mixtures containing components (I) and (II) in a weight ratio of from 10 : 0.5 to 0.5 : 10.

These mixtures are used as additives for phosphate-free or low-phosphate textile detergents or in cleaners for hard surfaces or in water softeners.

The novel mixtures contain, as component (I), polymers of monoethylenically unsaturated dicarboxylic acids having a molecular weight of from 200 to 5,000. These may be homo- or copolymers. The polymers may be in the form of the free acids or in partially or completely neutralized form. Neutralization is effected using alkali metal, ammonium or alkaline earth metal bases, for example sodium hydroxide solution, potassium hydroxide solution, sodium carbonate, potassium carbonate, sodium bicarbonate, potassium bicarbonate, ammonia, amines, such as dimethylamine, trimethylamine, diethylamine, triethylamine, n-butylamine, dibutylamine, hexylamine, ethanolamine, diethanolamine, triethanolamine or morpholine, magnesium oxide, magnesium hydroxide, calcium oxide, calcium hydroxide, calcium carbonate or barium hydroxide. Sodium hydroxide solution, potassium hydroxide solution or ammonia are preferably used for neutralizing the polymers.

Examples of suitable polymers of the monoethylenically unsaturated dicarboxylic acids of component (I) are polymers of maleic acid, fumaric acid, itaconic acid, mesaconic acid, citraconic acid, methylenemalonic acid and, where known, the corresponding anhydrides.

Polymaleic acid having a molecular weight of from 200 to 5,000 or the alkali metal or ammonium salts thereof are preferably used as component (I). Among the polymaleic acids, those having a molecular weight of from 300 to 2,000 are particularly effective in a mixture with the compounds of component (II).

The homopolymers of maleic acid are commercially available. They are prepared either by polymerizing maleic acid in an aqueous medium by a known process in the form of the free acid or in partially or completely neutralized form with free radical, preferably water-soluble initiators or by polymerizing maleic anhydride in an aromatic hydrocarbon at from 60° to 200° C. in the presence of polymerization initiators and hydrolyzing the polymer. For example, di-tert-butyl peroxide, organic percarbonates, diacyl peroxides or preferably peroxyesters are used as polymerization initiators. Examples of suitable aromatic hydrocarbons are toluene, xylene, ethylbenzene, diethylbenzene, isopropylbenzene, diisopropylbenzene and mixtures of the stated hydrocarbons. Particularly suitable peroxyesters are compounds which are derived from saturated $C_4$–$C_{10}$-carboxylic acids, eg. tert-butyl per-2-ethylhexanoate, tert-butyl perpivalate, tert-butyl perbenzoate and tert-butyl permaleate. Processes for the preparation of oligomaleic acids of the type described above are disclosed in, for example, U.S. Pat. No. 4,818,795, stated in connection with the prior art. The polymers of maleic acid may also be slightly crosslinked. Such polymers are disclosed in the abovementioned EP-A-0 264 627. They are prepared by polymerizing maleic anhydride with up to 2% by weight of a compound having at least 2 ethylenically unsaturated nonconjugated double bonds, in an aromatic hydrocarbon at from 60° to 200° C. in the presence of from 1 to 20% by weight, based on the monomers used, of an initiator. Preferably used initiators are peroxyesters. These polymers too have molecular weights up to 5,000.

Monomers which contain at least 2 ethylenically unsaturated, nonconjugated double bonds are usually used as crosslinking agents in the polymerization. They are mentioned above as component (c), which may be present in the preparation of the polymers of maleic acid.

Examples of suitable crosslinking agents of this type are diacrylates or dimethacrylates of at least dihydric saturated alcohols, eg. ethylene glycol diacrylate, ethylene glycol dimethacrylate, 1,2-propylene glycol diacrylate, 1,2-propylene glycol dimethylacrylate, butane-1,4-diol diacrylate, butane-1,4-diol dimethacrylate, hexanediol acrylate, neopentylglycol diacrylate, neopentylglycol dimethacrylate and 3-methyl-pentanediol dimethacrylate. The acrylates and methacrylates of alcohols having more than 2 OH groups may also be used as crosslinking agents, for example trimethylolpropane triacrylate or trimethylpropane trimethacrylate. A further class of crosslinking agents comprises diacrylates or dimethacrylates of polyethylene glycols or polypropylene glycols, each having molecular weights of from 200 to 6,000. Polyethylene glycols or polypropylene glycols which are used for the preparation of diacrylates or dimethacrylates preferably have a molecular weight of from 400 to 1,000 in each case. In addition to the homopolymers of ethylene oxide or of propylene oxide, block copolymers of ethylene oxide in which the ethylene oxide and propylene oxide units are randomly distributed may also be used. The oligomers of ethylene oxide or of propylene oxide are also suitable for the preparation of the crosslinking agents, for example diethylene glycol diacrylate, diethylene glycol dimethacrylate, triethylene glycol diacrylate, triethylene glycol dimethacrylate, tetraethylene glycol diacrylate and/or tetraethylene glycol dimethacrylate. Other suitable crosslinking agents are vinyl esters of ethylenically unsaturated $C_3$–$C_6$-carboxylic acids, eg. vinyl acrylate, vinyl methacrylate or vinyl itaconate. Vinyl esters of saturated carboxylic acids containing at least 2 carboxyl groups and di- and polyvinyl ethers of at least dihydric alcohols, eg. divinyl adipate, butanediol divinyl ether and trimethylolpropane trivinyl ether, are also suitable crosslinking agents. Further cross-linking agents are allyl esters of ethylenically unsaturated carboxylic acids, eg. allyl acrylate and allyl methacrylate, allyl ethers of polyhydric alcohols, eg. pentaerythrityl triallyl ether, triallylsucrose and pentaallylsucrose. Other suitable crosslinking agents are methylenebisacrylamide, methylenebismethacrylamide, divinylethyleneurea, divinylpropyleneurea, divinylbenzene, divinyldioxane, tetraallylsilane and tetravinylsilane.

The polymers of maleic acid can also be modified by carrying out polymerization of maleic acid or the alkali metal, ammonium or alkaline earth metal salts thereof in the presence of monomers of group (b) in an amount up to 20% by weight. Suitable compounds of this type are monoethylenically unsaturated monomers which are copolymerizable with maleic acid or maleic anhydride. Specific examples of suitable monomers of group (b) are the following compounds: hydroxyethyl acrylate, hydroxypropyl acrylate, hydroxybutyl acrylate, hydroxyethyl methacrylate, hydroxypropyl methacrylate, hydroxybutyl methyacrylate, monoethylene glycol maleate, the diesters of maleic acid and ethylene glycol, half esters of maleic acid and propylene glycol, half esters of fumaric acid which are derived from ethylene glycol or propylene glycol, diesters of maleic acid which are derived from propylene glycol, diesters of fumaric acid and ethylene glycol, monoesters of acrylic acid and polyethylene glycols having a molecular weight of from 200 to 6,000, methacrylates of polyethylene glycols having a molecular weight of 300 to 1,000, vinyl formate, vinyl acetate, vinyl propionate, vinyl butyrate, acrylic acid, methacrylic acid, acrylamidomethylpropanesulfonic acids, vinylphosphonic acid, vinylsulfonic acid, acrylates of mono-$C_1$–$C_{18}$-alcohols, such as methyl acrylate, ethyl acrylate, n-propyl acrylate, isopropyl acrylate, n-butyl acrylate, isobutyl acrylate, tert-butyl acrylate, 2-ethylhexyl acrylate and stearyl acrylate, and the mono- and diesters of maleic acid with monohydric $C_1$–$C_{18}$-alcohols, such as monomethyl maleate, dimethyl maleate, monoethyl maleate, diethyl maleate, monopropyl maleate, dipropyl maleate, mono-tert-butyl maleate, di-tert-butyl maleate, monomethyl fumarate, dimethyl fumarate, mono- tert-butyl fumarate, di-tert-butyl fumarate, monomethyl itaconate, dimethylaminoethyl acrylate, dimethylaminoethyl methacrylate, diethylaminoethyl acrylate, diethylaminoethyl methacrylate, dipropylaminoethyl acrylate, dipropylaminoethyl methacrylate, dipropylaminoneopentyl acrylate and dimethylaminoneopentyl methacrylate, and styrene, α-methylstyrene, 1-olefins of 2 to 30 carbon atoms, eg. ethene, propene, isobutene, diisobutene, octadecene and alkyl vinyl ethers where the alkyl radical is of 1 to 30 carbon atoms, eg. methylvinyl ether, ethylvinyl ether and isobutylvinyl ether.

Among the monomers of group (b), hydroxyethyl acrylate, hydroxypropyl acrylate, hydroxybutyl acrylate, hydroxyethyl methacrylate, hydroxypropyl methacrylate, hydroxybutyl methacrylate, vinyl acetate, vinyl propionate, dimethyl fumarate, di-tert-butyl maleate, acryl-amido-2-methylpropanesulfonic acid, acrylic acid, methacrylic acid, vinylphosphonic acid, methylvinyl ether and isobutene are preferably used. If the monomers of group (b) are used, they are preferably employed in an amount of from 1 to 10% by weight, based on the monomer mixture.

The copolymerization of monomers (a) and (b) may additionally be carried out in the presence of monomers (c) which are used in an amount of up to 2% by weight, based on the monomer mixture of (a), (b) and (c) and are compounds which contain at least 2 ethylenically unsaturated, nonconjugated double bonds and have been mentioned above. The molecular weight of the copolymers of maleic acid is likewise from 200 to 4,000, preferably from 300 to 2,000.

Polymaleic acid having a molecular weight of from 300 to 2,000, the alkali metal or ammonium salts thereof and copolymers of maleic acid and hydroxyethyl acrylate, hydroxypropyl acrylate, hydroxybutyl acrylate, vinyl acetate, isobutene, styrene and/or acrylic acid are preferably used as component (I) of the mixtures. These compounds are used either in the form of the free acids or in the form partially or completely neutralized with sodium hydroxide solution or ammonia.

Suitable compounds of component (II) are carboxyl-containing polymers, which can be divided into three groups. Group (1) includes copolymers of (a) from 10 to 70% by weight of monoethylenically unsaturated $C_4$–$C_8$-dicarboxylic acids or the alkali metal, ammonium or alkaline earth metal salts thereof and (b) from 30 to 90% by weight of monoethylenically unsaturated $C_3$–$C_{10}$-monocarboxylic acids or the alkali metal, ammonium or alkaline earth metal salts thereof.

The copolymers are preferably prepared by polymerizing the monomers of groups (a) and (b) by the process described in EP-B-0 075 820. An essential feature of this process is that the monomers are polymerized in an aqueous medium at a degree of neutralization of from 20 to 80% during the polymerization reaction, using hydrogen peroxide as a polymerization initiator.

Suitable monomers of group (a) are monoethylenically unsaturated $C_4$–$C_8$-dicarboxylic acids, such as maleic acid, fumaric acid, itaconic acid, mesaconic acid, methylenemalonic acid and citraconic acid. It is of course also possible to use the anhydrides of the dicarboxylic acids, which are converted into dicarboxylic acids on dissolution in water. Examples of suitable anhydrides of this type are maleic anhydride, itaconic anhydride and methylenemalonic anhydride. The copolymerization can also be carried out in an inert solvent. The copolymers formed when anhydrides are used and containing anhydride groups can then be converted in an aqueous medium into the acid form or, by adding a base, into the salt form of the copolymers. Preferably used monomers of group (a) are maleic acid, fumaric acid and itaconic acid. If maleic anhydride is used for the polymerization in an aqueous medium, it gives rise to maleic acid on dissolution in water. The monomers of group (a) are present in the copolymers in polymerized form preferably in an amount of from 15 to 60% by weight.

Suitable monomers of group (b) are monoethylenically unsaturated $C_3$–$C_{10}$-monocarboxylic acids or the salts thereof. Examples of suitable carboxylic acids of this type are acrylic acid, methacrylic acid, dimethylacrylic acid, ethylacrylic acid, allylacetic acid and vinylacetic acid. Acrylic acid, methacrylic acid or mixtures of these two carboxylic acids are preferably used from this group of monomers. They may be employed in the form of the free carboxylic acids or in partially or completely neutralized form as alkali metal, ammonium or alkaline earth metal salts in the copolymerization. The copolymers preferably contain from 40 to 85% by weight of the monomers of group (b) and have a molecular weight of from 10,000 to 150,000, preferably from 20,000 to 120,000.

Graft polymers which are disclosed in JP-A-55/155097, JP-A-61/031498 and EP-A-0 441 197 are suitable as group (2) of component (II) of the polymer mixtures. The detergent additives described in these publications are prepared by free radical polymerization of water-soluble monomers, such as acrylic acid or methacrylic acid, in the presence of mono- or polysaccharides. According to EP-A-0 441 197, monomer mixtures comprising (A) monoethylenically unsaturated $C_3$–$C_{10}$-carboxylic acids or the anhydrides, alkali metal, ammonium or alkaline earth metal salts thereof are prepared in the presence of (B) mono-, oligo- or polysaccharides which may be oxidatively, hydrolytically or enzymatically degraded, chemically modified mono-, oligo- and polysaccharides or mixtures of the stated compounds in a weight ratio (A) to (B) of (95 to 20) : (5 to 80). Suitable monoethylenically unsaturated C3-C10-carboxylic acids are all monomers which are stated as copolymers of group (1) under (a) and (b). Acrylic acid, methacrylic acid, maleic acid, fumaric acid, itaconic acid or mixtures of the stated carboxylic acids and the alkali metal or ammonium salts of these acids are preferred here.

Suitable components (B) are all natural substances based on polysaccharides, oligosaccharides, monosaccharides and derivatives thereof. These natural substances are, for example, saccharides of vegetable or animal origin or metabolic products and their degradation and modification products which are dispersible or soluble in water or alkalis or become dispersible or soluble during polymerization of the monomers (A). Suitable products of this type are stated in EP-A-0 441 197.

These are, for example, pectin, algin, chitin, chitosan, heparin, carrageenan, agar, gum arabic, tragacanthgum, karaya gum, ghatti gum, carob bean meal, guar gum, tara gum, inulin, xanthan, dextran, nigeran and pentosans, such as xylan and araban, the main components of which consist of D-glucuronic acid, D-galacturonic acid, methyl D-galacturonate, D-mannuronic acid, L-guluronic acid, D- and L-galactose, 3,6-anhydro-D-galactose, L-arabinose, L-rhamnose, D-xylose, L-fucose, D-mannose, D-fructose and D-glucose, 2-amino-2-deoxy-D-glucose and 2-amino-2-deoxy-D-galactose and the N-acetyl derivatives thereof.

From an economic point of view, starch, thermally and/or mechanically treated starch, oxidatively, hydrolytically or oxidized enzymatically degraded starch and chemically modified starches and chemically modified monosaccharides and oligosaccharides are preferably used as polysaccharides of component (B) in the graft polymerization. In principle, all starches are suitable. However, starches obtained from corn, wheat, rice, tapioca and in particular potato starch are preferred. The starches are virtually insoluble in water and can be converted into a water-soluble form in a known manner by thermal and/or mechanical treatment or by enzymatic or acid-catalyzed degradation. Oxidatively degraded starches are also suitable components (B). Examples of starch degradation products which are obtainable either by oxidative, hydrolytic or enzymatic degradation of the starch are the following compounds: dextrins, such as white and yellow dextrins, maltodextrins, glucose syrups, maltose syrups, hydrolysis products having a high content of D-glucose, starch saccharification products and maltose and D-glucose and its isomerization product fructose. Mono- and oligosaccharides, such as galactose, mannose, ribose, sucrose, raffinose, lactose and trehalose, and degradation products of cellulose, for example cellobiose and its oligomers, are of course suitable components (B).

Other suitable components (B) are oxidized starches, for example dialdehyde starch, and oxidized starch degradation products, such as gluconic acid, glucaric acid and glucuronic acid. Such compounds are obtained, for example, by oxidation of starch with periodate, chromic acid, hydrogen peroxide, nitrogen dioxide, nitrogen tetroxide, nitric acid or hypochlorite.

Chemically modified polysaccharides, in particular chemically modified starches, for example starch degradation products and starches converted into esters with acids and into ethers with alcohols, are also suitable components (B). These substances can be esterified with inorganic acids or the anhydrides or chlorides thereof. In the case of direct esterification, the liberated water leads to acid-catalyzed cleavage of glycosidic bonds. Phosphated and acetylated starches and starch degradation products are of particular industrial interest. The commonest method for etherifying starch is to treat the starch and the starch degradation products with organic halogen compounds, epoxides or sulfates in aqueous alkaline solution. Starch ethers are, for example, the alkyl ethers, hydroxyalkyl ethers, carboxyalkyl ethers and allyl ethers of starch. Chemically modified starches according to component (B) are also intended to include cationically modified starches, for example starches reacted with 2,3-epoxypropyltrimethylammonium chloride, as described in, for example, U.S. Pat. No. 3,649,616.

Chemically modified polysaccharides include, for example, carboxymethylcellulose, hydroxyethylcellulose, hydroxypropylcellulose, carboxymethylhydroxyethylcellulose, sulfoethylcellulose, carboxymethylsulfoethylcellulose, hydroxypropylsulfoethylcellulose, hydroxyethylsulfoethylcellulose, methylsulfoethylcellulose and ethylsulfoethylcellulose.

Other suitable components (B) are chemically modified degraded starches, for example hydrogenation products of starch hydrolysis products, such as sorbitol and mannitol, maltite and hydrogenated glucose syrups or oxidized hydrolytically degraded or oxidized enzymatically degraded starches. The products in the acid-catalyzed or enzymatic transglycosidation or glycosidation are also suitable, for example methylglucoside.

Graft polymers which are obtainable by free radical polymerization of (A) acrylic acid, methacrylic acid, maleic acid, mixtures thereof or the alkali metal or ammonium salts thereof in the presence of (B) monosaccharides, starch saccharification products or hydrogenated starch hydrolysis products are preferably used.

Graft polymers which are obtainable by free radical polymerization of monomer mixtures of (A) from 15 to 60% by weight of maleic acid, fumaric acid, itaconic acid or the alkali metal or ammonium salts thereof and from 40 to 85% by weight of acrylic acid, methacrylic acid, mixtures thereof or the alkali metal or ammonium salts of the stated acids in the presence of (B) monosaccharides, starch saccharification products, hydrogenated starch hydrolysis products or mixtures thereof are also preferred as component (II).

Graft polymers which are obtainable by free radical polymerization of monomer mixtures of (A) from 20 to 55% by weight of maleic acid, itaconic acid or the alkali metal or ammonium salts thereof and from 45 to 80% by weight of acrylic acid, methacrylic acid, mixtures thereof or the alkali metal or ammonium salts of the stated acids in the presence of (B) monosaccharides, starch saccharification products, hydrogenated starch hydrolysis products or mixtures thereof are of particular interest.

The graft polymers have molecular weights of from 5,000 to 150,000, preferably from 10,000 to 100,000.

Polyaminocarboxylic acids and/or polymers containing aminocarboxylic acid groups, as described in, for example, EP-A-0 454 126 for use in detergents, are suitable as group (3) of component (II) of the polymer mixtures. Polymers of aspartic acid and glutamic acid and the products partially or completely neutralized with ammonia or alkalis are preferably used. The molecular weights of such polymers are from 1,000 to 150,000, preferably from 2,000 to 100,000. Homopolymers of aspartic acid and cocondensates of aspartic acid with other amino acids are known. They are prepared, for example, by thermal condensation of aspartic acid or mixtures of aspartic acid with at least one other amino acid. The thermal condensation is preferably carried out in the presence of phosphoric acid.

Modified polyaspartic acids which are obtainable by polycondensation of from 1 to 99.9 mol % of aspartic acid with from 99 to 0.1 mol % of fatty acids, polybasic carboxylic acids, anhydrides of polybasic carboxylic acids, polybasic hydroxycarboxylic acids, monobasic polyhydroxy-carboxylic acids, alcohols, amines, alkoxylated alcohols and a mines, amino sugars, carbohydrates, sugar carboxylic acids and/or nonproteinogenous amino acids or by polymerization of monoethylenically unsaturated monomers in the presence of polyaspartic acids and/or cocondensates of aspartic acid by a free radical graft polymerization are also suitable as group (4) of component (II) of the mixtures.

Such modified polyaspartic acids are prepared, for example, by subjecting from 1 to 99.9 mol % of aspartic acid to polycondensation with from 99 to 0.1 mol % of fatty acids, polybasic carboxylic acids, anhydrides of polybasic carboxylic acids, polybasic hydroxycarboxylic acids, monobasic polyhydroxycarboxylic acids, alcohols, amines, alkoxylated alcohols and amines, amino sugars, carbohydrates, sugar carboxylic acids and/or nonproteinogenous amino acids at from 100° to 270° C. or by polymerizing monoethylenically unsaturated monomers in the presence of polyaspartic acids, cocondensates of aspartic acid or the ammonium, alkali metal or alkaline earth metal salts of polyaspartic acids and/or their cocondensates and free radical polymerization initiators.

The polycondensation is preferably carried out in the presence of acids, for example hydrochloric acid, phosphoric acid, polyphosphoric acids, phosphorous acid, hypophosphorous acid, sulfuric acid, disulfuric acid, sulfur trioxide, sodium bisulfate, potassium bisulfate or mixtures of the stated acids, for example mixtures of hydrochloric acid and phosphoric acid or phosphorous acid. For example, from 0.05 to 2, preferably up to 1, mol of an inorganic acid or of a mixture of such acids may be used per mol of aspartic acid.

Polycondensates of aspartic acid with at least one of the abovementioned comonomers are obtained in the form of the water-insoluble polyaspartimides. These can be converted into the modified polyaspartic acids by suspending the polyaspartimides in water and neutralizing them at, for example, from 0° to 90° C. with the addition of a base, such as sodium hydroxide solution, potassium hydroxide solution, calcium hydroxide or ammonia. Polycondensates which contain from 1 to 99.9 mol % of aspartic acid and from 99 to 0.1 mol % of at least one of the abovementioned cocondensable compounds as condensed units are then obtained in the form of the alkali metal, alkaline earth metal or ammonium salts.

The graft polymers of group (2) which are described above and the polymers of group (3) which preferably include polymers containing polyaspartic acid and/or aspartic acid groups, or alkali metal or ammonium salts thereof, are preferably used as component (II) of the novel mixtures. The novel mixtures contain the components (I) and (II) in a weight ratio of from 10 : 0.5 to 0.5 : 10, preferably from 3 : 1 to 1 : 3.

It is often advantageous first to prepare the polymers of group (I) and then to polymerize the polymers of group (II) in the presence of polymers of group (I). It is sometimes also advantageous to adopt the reverse procedure and first to prepare the polymers of group (II) and then to polymerize the polymers of group (I) in the presence of the polymers of group (II). The polymers of one group are partially grafted onto the polymers of the other group.

The mixtures described above are used as additives for phosphate-free or low-phosphate textile detergents. Compared with the individual components, they provide unexpectedly improved incrustation inhibition and a simultaneous improvement in the primary washing action.

Phosphate-reduced textile detergents are to be understood as being those formulations which contain up to 25% by weight, calculated as pentasodium triphosphate, of phosphate. The detergent formulation usually contains surfactants in amounts of from 1 to 50% by weight, in certain cases even larger amounts of surfactant and, if required, builders. These data are applied to both liquid and powder detergent formulations. Examples of the composition of detergent formulations which are conventionally used in Europe, the USA and Japan are tabulated, for example, in Chemical and Engn. News 67 (1989), 35, and in Ullmanns Encyklopädie der technischen Chemie, Verlag Chemie, Weinheim 1983, 4th Edition, pages 63–160. Further information on the composition of detergents and cleaning agents appears in WO-A-90/13581. Furthermore, such detergent formulations may contain, as builders, also alkali metal silicates in amorphous form or in the form of sheet silicates.

The novel polymer mixtures are particularly advantageously used in phosphate-free compact detergents. Such detergents contain, for example, 5 to 25, preferably from 10 to 20, % by weight of anionic and/or nonionic surfactants, from 20 to 45% by weight of zeolite A or sheet silicates which may be either amorphous or crystalline, as builders, from 10 to 20% by weight of sodium carbonate and from 3 to 10% by weight of the novel polymer mixtures.

The formulations described above also contain further conventional additives, for example polyvinylpyrrolidone as a colour transfer inhibitor, carboxymethylcellulose and/or bleaches, such as perborates.

The mixtures of components (I) and (II) are present in the detergent formulations in an amount of from 0.2 to 20, preferably from 0.5 to 15, % by weight.

Water softeners which may be added to the washing process in addition to the detergents usually contain sodium tripolyphosphate, zeolite, nitrilotriacetate, if necessary surfactants and from 2 to 40% of the novel polymer mixtures. A phosphate-free water softener formulation contains, for example, 70% of zeolite A, 15% of sodium carbonate, 5% of citrate and 10% of the polymer mixture.

The novel mixtures are furthermore used as dispersants and coating inhibitors in cleaners for hard surfaces. Compared with the individual components in a cleaner formulation, in this case too the mixtures surprisingly display substantially better coating inhibition than the individual components of groups (I) and Cleaners for hard surfaces are to be understood as meaning, for example, cleaners for cleaning metal, plastic, glass and ceramic, floor cleaners, sanitary cleaners, general purpose cleaners in the household and in commercial applications, industrial cleaners (for use in car washes or high-pressure cleaners), cold cleaners, dish cleaners, clear rinses, disinfecting cleaners, cleaners for the food and beverage industry, in particular as bottle cleaners and as CIP (cleaning-in-place) cleaners in dairies, breweries and other establishments of food producers. Cleaners which contain the novel polymer mixtures are particularly suitable for cleaning hard surfaces, such as glass, plastic and metal. The cleaners may be rendered alkaline, acidic or neutral. They usually contain surfactants in amounts of from about 0.2 to 50% by weight. These may be anionic, nonionic or cationic surfactants or mixtures of surfactants which are compatible with one another, for example mixtures of anionic and nonionic or of cationic and nonionic surfactants. Alkaline cleaners may contain sodium carbonate, potassium carbonate, sodium bicarbonate, potassium bicarbonate, sodium sesquicarbonate, potassium sesquicarbonate, sodium hydroxide, potassium hydroxide, amine bases, such as monoethanolamine, diethanolamine, triethanolamine or ammonia, or silicates in amounts of up to 60% by weight and in some cases even up to 80% by weight. The cleaners may furthermore contain citrates, gluconates or tartrates in amounts up to 80% by weight. They may be in solid or liquid form. The novel mixtures of components (I) and (II) are present in the cleaners in amounts of from 0.2 to 20, preferably from 0.5 to 15, % by weight.

In the Examples which follow, parts and percentages are by weight, unless stated otherwise. The molecular weights of the polymers were determined from the sodium salts by the method of gel permeation chromatography (GPC) using aqueous eluents. The separation columns are calibrated using sodium polyacrylate mixtures which have a broad molecular weight distribution and whose integral molecular weight distribution curve was determined by GPC/laser stray coupling according to the calibration principle of M. J. R. Cantow et al. (cf. J. Polym. Sci. A-1,5 (1967), 1391–1394), but without the concentration correction proposed there (cf. R. Brüssau, W. Goetz, W. Mächtle and J. St olting—Characterization of Polyacrylate Samples in Tenside Surfactants Detergents, No. 6/91, pages 396 to 406, year 28).

The mixing data are based on 100% pure polymer.

EXAMPLES

The following polymers were used for the preparation of the novel mixtures of components I and II:

Component I:
Polymaleic acid 1
Polymaleic acid prepared according to EP-B-0 261 589, Example 7. The molecular weight (Mw) is 580 g/mol.
Polymaleic acid 2
The preparation is carried out according to EP-A-0 451 508, as follows:
In a reactor having an anchor stirrer, a reflux condenser and a feed apparatus, 105.5 g of distilled water, 392 g of maleic acid anhydride and 4.72 g of a 1% strength solution of iron(II) ammonium sulfate are heated to the boil, and 448 g of 50% strength sodium hydroxide solution are metered in uniformly in the course of I hour. 272.16 g of 50% strength hydrogen peroxide are then metered in uniformly at the boil in the course of 3 hours, and refluxing was continued for a further hour. After cooling, a clear, colorless polymer solution having a pH of 6.6 and a solids content of 48.6% is obtained. The molecular weight (Mw) is 1,200 g/mol.
Polymaleic acid 3
The preparation was carried out according to Example 7 of European Patent 396,303. The molecular weight Mw is 1,230 g/mol.
Polymaleic acid 4
The preparation was carried out according to Example 7 of EP-B-0 009 171. The molecular weight is 800 g/mol.
Component
Copolymer 1,
commercial sodium salt of a copolymer of 70% by weight of acrylic acid and 30% by weight of maleic acid, having a molecular weight of 70,000 g/mol.
Homopolymer 1,
commercial sodium salt of a polyacrylic acid, having a molecular weight of 8,000 g/mol.
Homopolymer 2,
commercial sodium salt of a polyaspartic acid having a molecular weight of 6,000 g/mol..
Graft polymer 1
The preparation was carried out according to Example 6 of EP-A-0 441 197. The molecular weight is 35,000 g/mol.

Testing of performance characteristics

1. Cleaner for hard surfaces
Testing of the polymers and polymer mixtures described above in dish cleaners
Formation of coating on dishes
Test formulation:

15 parts of sodium citrate.2H$_2$O
9 parts of sodium disilicate
30 parts of sodium carbonate
10 parts of sodium perborate.4H$_2$O
1 part of a reaction product of 1 mol of C$_{16}$/C$_{18}$ fatty alcohol alkoxylate with 3 mol of ethylene oxide and 4 mol of propylene oxide
5 parts of the polymer or polymer mixture stated in each case in Table 1

| | |
|---|---|
| Test apparatus | Miele G7735 dishwasher |
| Water hardness | Drinking water (about 17° d) |
| Cleaner dose | 4 g/l |
| Program | Cleaning cycle for 20 min |
| | Intermediate rinsing cycle for 4 min |
| | Clear rinsing for 10 min (without clear rinse) |

-continued

| | |
|---|---|
| Rinsing cycles | 7 |
| Test dishes | Porcelain plates, black |
| | Plastic plates (Luran ®), black |
| | Stainless steel |
| | Tea glasses |

Evaluation:

After each cycle, visual estimation of the coating thickness on the various dish parts on the basis of coating indices (scale 0–6)
0 = no coating    6 = very pronounced coating
Calculation of the cumulative coating index by addition of the individual indices from 7 rinse cycles
Subtraction of the cumulative index from 42 (= maximum number of points)
Representation of the results on a point scale from 0 to 42

0 = very pronounced coating already after the 1st cycle
42 = no coating at all even after the 7th cycle The results of the test are summarized in Table 1.

TABLE 1

Test results for dish cleaners when the polymers or polymer mixtures stated in the Table are used

| | | | Number of points | | |
|---|---|---|---|---|---|
| Example | Comparative Example | Addition of polymer | Plastic | Glass | Stainless steel |
| — | 1 | Polymaleic acid 1 | 32 | 31 | 28 |
| — | 2 | Polymaleic acid 2 | 36 | 26 | 24 |
| — | 3 | Polymaleic acid 3 | 21 | 29 | 27 |
| — | 4 | Polymaleic acid 4 | 30 | 34 | 23 |
| — | 5 | Copolymer 1 | 11 | 27 | 24 |
| — | 6 | Homopolymer 1 | 7 | 33 | 28 |
| — | 7 | Graft polymer 1 | 10 | 31 | 25 |
| | | Addition of polymer mixtures of | | | |
| 1 | — | 1 part of polymaleic acid 1<br>3 parts of copolymer 1 | 38 | 35 | 30 |
| 3 | — | 3 parts of polymaleic acid 3<br>1 parts of graft polymer 1 | 33 | 39 | 34 |
| 4 | — | 1 part of polymaleic acid 2<br>1 part of graft polymer 1 | 39 | 37 | 31 |

As is evident from Table 1, the novel mixtures in the dish cleaner formulation (Examples 1 to 5) are substantially more effective than the polymers alone (Comparative Examples 1 to 7).

Phosphate-free compact detergent for textile materials

For testing the effect of the polymers on the primary and secondary washing action, the following detergent formulation was used:
8.0% of dodecylbenzenesulfonate
7.0% of $C_{13}$–$C_{15}$ oxo alcohol+7 ethylene oxide.
2.0% of soap
6.0% of zeolite A
2.0% of sodium carbonate
5.0% of polymer (100% pure) according to the data in Table 2
1.0% of CMC (carboxymethylcellulose)
22.0% of sodium perborate monohydrate
3.5% of bleach activator (sodium tetraethylenediamine-acetate)
0.2% of a commercial optical brightener and
3.3% of sodium sulfate

| Washing conditions: | | |
|---|---|---|
| | Primary washing action | Secondary washing action Incrustation |
| Washing machine | Launder-O-meter | Launder-O-meter |
| Water hardness | 3 mmol Ca/Mg/l = 16.8° d | 4 mmol Ca/Mg/l = 22.4° d |
| Ca:Mg ratio | 4:1 | 4:1 |
| Washing temperature | 60° C. | 60° C. |
| Wash cycles | 1 | 15 |
| Detergent dose | 4.5 g/l | 4.5 g/l |
| Liquor ratio | 1:12.5 | 1:12.5 |
| Fabric | *WFK 10D<br>WFK 20D } 5 g each | Cotton (20 g) |
| | EMPA 101 | |
| | EMPA 104<br>Cotton (10 g) } 5 g each | |
| | | Ashing of the fabric in a muffle furnace at 700° C. |

*WFK fabrics 10D and 20D (standard soiling with pigment/skin fat)
EMPA fabrics 101 and 104 (standard soiling with carbon black/olive oil)
WFK 10D = cotton
EMPA 101 = cotton
WFK 20D = polyester/cotton
EMPA 104 = polyester/cotton
Whiteness = reflection, total for 4 fabrics
WFK 10D    Cotton
WFK 20D    Polyester/cotton
EMPA 101   Cotton
EMPA 104   Polyester/cotton The polymers or polymer mixtures used in each case in the tests and the results obtained are shown in Table 2.

TABLE 2

Primary and secondary washing actions of polymers in the detergent formulation described above

| Example | Comparative Example | Addition of polymer | Whiteness [reflection] | Ash (% by weight) |
|---|---|---|---|---|
| — | 8 | No polymer added | 160 | 5.34 |
| — | 9 | Polymaleic acid 1 | 170 | 2.45 |
| — | 10 | Polymaleic acid 2 | 172 | 2.44 |
| — | 11 | Copolymer 1 | 175 | 3.05 |
| — | 12 | Homopolymer 1 | 165 | 3.60 |
| — | 13 | Homopolymer 2 | 168 | 3.38 |
| — | 14 | Graft polymer 1 | 173 | 2.45 |
| 6 | | 1 part of polymaleic acid 1<br>1 part of copolymer 1 | 180.5 | 1.95 |
| 7 | | 1 part of polymaleic acid 2<br>1 part of copolymer 1 | 180 | 2.07 |
| 9 | | 1 part of polymaleic acid 2<br>1 part of homopolymer 2 | 175 | 2.18 |
| 10 | | 1 part of polymaleic acid 1<br>1 part of graft polymer 1 | 182 | 1.73 |
| 11 | | 1 part of polymaleic acid 2<br>1 part of graft polymer 1 | 179 | 1.88 |
| 12 | | 2 parts of polymaleic acid 1<br>1 part of copolymer 1 | 180 | 1.82 |
| 13 | | 2 parts of polymaleic acid 2<br>1 part of copolymer 1 | 183 | 1.70 |
| 16 | | 2 parts of polymaleic acid 1<br>1 part of graft polymer 1 | 180 | 1.25 |
| 17 | | 2 parts of polymaleic acid 2<br>1 part of graft polymer 1 | 182 | 1.29 |
| 18 | | 1 part of polymaleic acid 2<br>3 parts of homopolymer 2 | 178 | 1.45 |

TABLE 2-continued

Primary and secondary washing actions of polymers in the detergent formulation described above

| Example | Comparative Example | Addition of polymer | Whiteness [reflection] | Ash (% by weight) |
|---|---|---|---|---|
| 19 | | 1 part of polymaleic acid 2<br>2 parts of homopolymer 2 | 182 | 1.46 |

As is evident from Table 2, the novel mixtures (Examples 6 to 19) are substantially more effective than the same amount of a single polymer (Comparative Examples 8 to 14).

We claim:

1. A mixture of (I)

polymers of monoethylenically unsaturated dicarboxylic acids having a molecular weight of from 200 to 5,000 and comprising (a) from 80 to 100% by weight of monoethylenically unsaturated dicarboxylic acids having 4 to 8 carbon atoms or alkali metal, ammonium or alkaline earth metal salts thereof, (b) from 0 to 20% by weight of copolymerizable, monoethylenically unsaturated monomers, or (c) from 0 to 2% by weight of copolymerizable monomers which contain at least two ethylenically unsaturated double bonds, or (d) mixtures of (b) and (c), and (II)

(1) copolymers having a molecular weight of from 10,000 to 150,000 and comprising (a) from 10 to 70% by weight of monoethylenically unsaturated $C_4$–$C_8$-dicarboxylic acids or alkali metal, ammonium or alkaline earth metal salts thereof and (b) from 30 to 90% by weight of monoethylenically unsaturated $C_3$–$C_5$-monocarboxylic acids or alkali metal, ammonium or alkaline earth metal salts thereof, (2) graft polymers having a molecular weight of from 5,000 to 150,00 obtained by free radical polymerization of (A) monoethylenically unsaturated $C_3$–$C_{10}$-carboxylic acids or anhydrides, alkali metal salts, ammonium salts or alkaline earth metal salts thereof, in the presence of (B) mono-, oligo- or polysaccharides which may be oxidatively, hydrolytically or enzymatically degraded chemically modified mono-, oligo- or polysaccharides or mixtures of the stated compounds in a weight ratio (A) : (B) of 95 to 20 : 5 to 80 or (3) polymers of aspartic acid, glutamic acid, mixtures thereof, and derivatives thereof, the mixtures containing components (I) and (II) in a weight ratio of from 1:3 to 3:1.

2. A mixture as claimed in claim 1, which contains, as component (I), a polymaleic acid having a molecular weight of from 200 to 5,000 or an alkali metal or ammonium salt thereof.

3. A mixture as claimed in claim 1, which contains, as component (II), a copolymer having a molecular weight of from 20,000 to 120,000 and comprising (a) maleic acid, fumaric acid, itaconic acid or the alkali metal or ammonium salts thereof and (b) acrylic acid, methacrylic acid, mixtures thereof or the alkali metal or ammonium salts thereof.

4. A mixture as claimed in claim 1, which contains, as component (II), a graft polymer prepared by free radical polymerization of (A) acrylic acid, methacrylic acid, maleic acid, fumaric acid, mixtures thereof or the alkali metal or ammonium salts thereof in the presence of (B) monosaccharides, starch saccharification products or hydrogenated starch hydrolysis products.

5. A mixture as claimed in claim 1, which contains, as component (II), a graft polymer obtained by free radical polymerization of a monomer mixture of (A) from 15 to 60% by weight of maleic acid, fumaric acid, itaconic acid or the alkali metal or ammonium salts thereof and from 40 to 85% by weight of acrylic acid, methacrylic acid, mixtures thereof or the alkali metal or ammonium salts of the stated acids in the presence of (B) monosaccharides, starch saccharification products, hydrogenated starch hydrolysis products or mixtures thereof.

6. A mixture as claimed in claim 1, which contains, as component (II), polyaspartic acid or polymers containing aspartic acid groups or the alkali metal or ammonium salts thereof.

7. A phosphate-free or low-phosphate detergent comprising at least 1% by weight surfactant and further comprising an incrustation inhibiting and primary washing effective amount of the mixture as claimed in claim 1.

8. The detergent composition according to claim 7, containing up to 25% by weight, calculated as pentasodium triphosphate, of phosphate, from 1 to 50% by weight surfactant and, optionally, other builders.

9. The detergent composition according to claim 8, containing 5 to 25% by weight of anionic surfactant or nonionic surfactant or mixtures thereof from 20 to 45% by weight of zeolite or sheet silicates as builders, from 10 to 20% by weight of sodium carbonate, and from 3 to 10% by weight of the mixture as claimed in claim 1.

10. A cleaner for hard surfaces, comprising an anionic surfactant, nonionic surfactant, cationic surfactant or a mixture thereof, and a cleaning effective amount of the mixture as claimed in claim 1.

11. The cleaner composition according to claim 10, containing 0.2 to 20% by weight of the mixture as claimed in claim 1 and said surfactants are present in an amount of 0.2 to 50% by weight.

12. A water softener, comprising water-softening effective amounts of sodium tripolyphosphate, a zeolite, nitrilotriacetate, a surfactant or a mixture thereof, and the mixture as claimed in claim 1.

13. The water softener composition according to claim 12, containing 2 to 40% by weight of the mixture as claimed in claim 1.

* * * * *